United States Patent [19]

McKeown

[11] Patent Number: 6,090,432
[45] Date of Patent: Jul. 18, 2000

[54] HEALTH ENHANCING SALAD DRESSING

[76] Inventor: Michael J. McKeown, 4405 Coast Hwy., North Bend, Oreg. 97459

[21] Appl. No.: 08/918,334

[22] Filed: Aug. 26, 1997

[51] Int. Cl.⁷ ....................................................... A23B 9/00
[52] U.S. Cl. ........................................... 426/601; 426/634
[58] Field of Search .................................... 426/605, 601, 426/634

[56] References Cited

U.S. PATENT DOCUMENTS

| | | | |
|---|---|---|---|
| 883,930 | 4/1908 | Bloom | 426/605 |
| 5,346,713 | 9/1994 | Leader | 426/454 |
| 5,397,778 | 3/1995 | Forse | 514/198 |
| 5,405,633 | 4/1995 | Heidlas | 426/442 |
| 5,536,523 | 7/1996 | Blauel | 426/601 |
| 5,612,074 | 3/1997 | Leach | 426/601 |
| 5,674,853 | 10/1997 | Forse | 514/25 |
| 5,776,463 | 7/1998 | Arginteanu | 426/597 |

OTHER PUBLICATIONS

Lowe 1937 Experimental Cookery John Wiley New York p. 266–287.
Kimball 1996 The Cooks Bible Little Brown and Co. Boston p. 121, 122.
Gerras 1984 Rodales Basic Natural Foods Cookbook Rodale Press Pennsylvania p. 144, 145.
Brickler 1981 The Natural Healing Cookbook Rodale Press Pennsylvania p. 45, 209.
Constable 1986 Fresh Ways with Salads Time–Life Books, Virginia p. 13.
Swern 1979 Baileys Industrial Oil and Fat Products vol. 1, 4th edition John Wiley & Sons New York p. 424–429.

*Primary Examiner*—Carolyn Paden
*Attorney, Agent, or Firm*—Robert L. Harrington

[57] ABSTRACT

A health enhancing salad dressing that incorporates food groups that have been shown to lower cholesterol in humans. The prime ingredients are soy protein (tofu), flax oil and vinegar. Herbs, spices and other flavorings are added to provide a desired flavor.

7 Claims, 1 Drawing Sheet

HEALTH ENHANCING SALAD DRESSING

FIELD OF THE INVENTION

This invention relates to the provision of a food product, namely salad dressing, that is as appetizing and tasteful as popular salad dressings but unlike such salad dressings and unlike the commonly termed low fat salad dressings is health enhancing.

BACKGROUND OF THE INVENTION

Health foods are in abundant supply and growing daily. A fairly large segment of the population consumes health foods on a regular basis and benefit from better health. However, a far greater segment of the population suffers from health problems due to poor eating habits in spite of the ready availability of health foods.

The reasons are many and complex. One known factor is that many people consider eating to be one of life's few true pleasures and they aren't willing to permanently sacrifice good taste for incremental benefits that may ultimately result in improved health.

Health publications are rife with recipes for substituting healthy ingredients for unhealthy ingredients to make favorite foods more healthy. Invariably the objective is not to make the product as good tasting as the original but close enough to be tolerated by someone who is concerned enough to make a modest sacrifice. The present invention is intended to go beyond the achievement of "almost-as-good as" and instead is as good or better than the original. Furthermore, the present invention is not a substitute ingredient. The major portion of the food product of the present invention (salad dressing) consists of health enhancing ingredients, i.e., they don't simply avoid the bad (e.g., fat), they improve specific health conditions (e.g., cholesterol). The more one ingests, the greater the health improvement. The consumer both likes the product and is encouraged to eat as much as he/she wants.

SUMMARY OF THE INVENTION

Flax oil has been determined to produce health benefits. For example, it is known that persons with high cholesterol can reduce their cholesterol by consuming daily quantities of flax oil. Flax oil has the consistency of a thin liquid and although it is not foul tasting, it does not produce a particularly good taste. It has an appeal to the population similar to that of cod liver oil.

Tofu is another health food product (made from soy beans) that produces health benefits, e.g., it also reduces cholesterol but different than the mechanism by which flax oil reduces cholesterol. It also is not appealing because of its consistency and/or taste. It has a consistency something like that of cream custard. Both tofu and flax oil are used in food products but primarily as fillers where both taste and consistency are covered up by the primary ingredients.

The present invention results from a rather startling discovery. Whereas mixing tofu and flax oil produces a composition that is somewhat slimy in appearance, the addition of vinegar transforms that mixture to resemble the appearance of many salad dressings. Furthermore the blend of flax oil, soft tofu and vinegar can be varied to match both cream-type salad dressings and oil-type salad dressings. Equal parts of each of the ingredients (soft tofu, flax oil and vinegar) will produce the oil-type dressings and increasing the tofu up to or exceeding twice that of either of the other two ingredients will produce the creamy salad dressings.

The taste of the mixture is not particularly appealing but also not particularly distasteful. Flavoring additives of various types and amounts readily converts the mixture to a better than good tasting salad dressing. Subjects who have tried the salad dressings when told that the more they consume the better it is for them, will double and triple the normal amount of salad dressing typically consumed. Furthermore, when given a choice based only on taste, subjects have voluntarily selected the health enhancing salad dressings.

It is believed to be a major step of the present invention to have achieved the desirable consistency by intermixing the flax oil and soft tofu with an equal amount of vinegar. The vinegar produces or creates an unexpected catalyst-type effect which blends the three ingredients into the consistency most typically accepted for salad dressings.

The invention will be more fully appreciated and understood from the following detailed description having reference to the accompanying drawings.

DESCRIPTION OF THE PREFERRED EMBODIMENT

Figure 1:
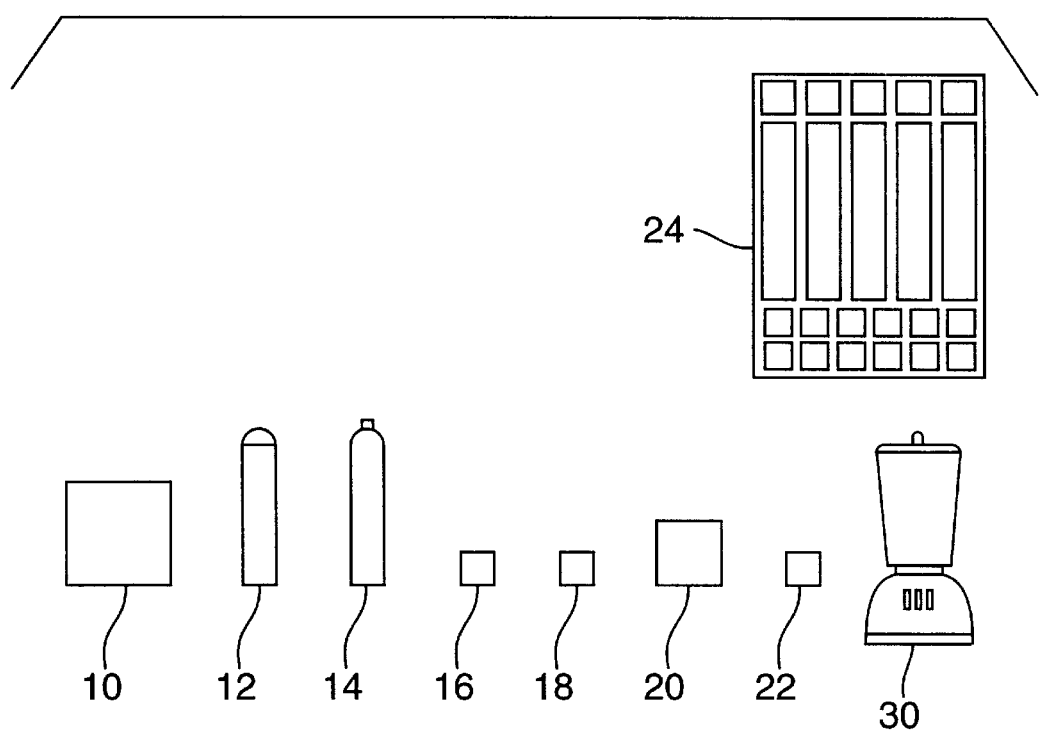
FIG. 1 illustrates in diagram form a method of producing a health enhancing salad dressing.

There have been many studies conducted on the benefits of consuming soy protein rather than animal protein. One of the health concerns of today is the cholesterol levels. Studies have shown that substituting soy protein for animal protein reduces the concentration of serum cholesterol in humans primarily due to changes in LDL cholesterol (the so called bad cholesterol). Studies have shown a significant decrease in serum concentrations of total cholesterol, particularly LDL cholesterol, without significantly affecting serum the HDL cholesterol concentrations. Reducing the total cholesterol, particularly the LDL cholesterol, has many benefits for the health of an individual, including lower risk of heart attack.

Soy protein is obtained from soy beans. A well known source of soy protein is tofu, also known as a soy bean curd. Tofu is a soft cheese-like food made by curdling fresh hot soy milk with a coagulant. There are three types of tofu currently available in the marketplace. Firm tofu is dense and solid which holds its shape well and is utilized in many dishes. Soft tofu is similar to firm tofu yet the texture works well for blending tofu with other food groups. Silken tofu is made by a slightly different process that produces a creamy custard-like product. As will be later explained, soft tofu is utilized in the salad dressing of the present invention.

Essential fatty acids are necessary for sustaining good health in humans. Essential fatty acids are not produced by the body and thus must be ingested by eating certain food groups. There are two fatty acids essential to human health. The first is the omega six essential fatty acid which is called linoleic acid which is abundant in polyunsaturated safflower, sunflower and corn oils. The second, known as an omega three essential fatty acid, is called alpha-linolenic acid. The omega three fatty acid is found abundantly in flax, hemp and fish oils.

One of the benefits of flax oil is that it contains more than twice the amount of omega three oil compared to fish oil. Additionally, the flax oil has a better flavor than fish oil, the flax oil being compared to a nutty-type flavor. Flax oil is typically produced by mechanically pressing the flax seeds to extract the oil out of the seeds.

Omega three fatty acids, such as flax oil, have been shown to reduce high blood cholesterol levels as well as being beneficial in the prevention and treatment of other diseases.

Refer now to FIG. 1 of the drawings. The unique properties of flax oil and soy protein (tofu) are complimentary in promoting the lowering of the cholesterol of one who ingests same. The health enhancing salad dressing of the present invention utilizes tofu and flax oil as the prime ingredients. Simply blending flax oil and tofu does not produce a palatable mixture. It has been found that adding vinegar to the mixture of tofu and flax oil provides a mixture that is palatable and may be controlled as to the degree of thickness. FIG. 1 illustrates a quantity of tofu 10, a quantity of flax oil 12, a quantity of vinegar 14 and various herbs and spices such as onion powder 16, garlic powder 18, blue cheese 20, and a mixture of fine herbs 22. It will be appreciated that other ingredients such as ginger, cinnamon, cloves, honey and others may be utilized as well in the following recipes. The other known flavoring ingredients are designated as 24.

The following four recipes are intended to be used as a examples in a manner to use flax oil and tofu to produce a salad dressing that has the attributes of a dressing that has a fine taste and further has the property of providing a user with the food that actually promotes the lowering of cholesterol. It will be appreciated that the recipes may be modified to suit the user. The measures listed are provided as a guide-line for the desired ratios of the components. The measures used will depend in part on the quantity of the end product desired.

The first recipe is one intended for general use and comprises one cup flax oil 12, one cup soft tofu 10, one cup rice vinegar 14, one teaspoon fine herbs 22, one teaspoon garlic powder 18 and one teaspoon of onion powder 16. The herbs and spices are added in quantities to suit the taste of a consumer and may be altered from selection and quantities listed. All of the ingredients are placed in the blender 30 and blended on high until a fine mixture is obtained. The mixture is then placed in a glass container 32 under refrigeration until it is to be used. One of the reasons for refrigerating the salad dressing is the fragile nature of the flax oil.

The second example is a recipe for a blue cheese dressing and has the following ingredients: one cup flax oil 12, one cup soft tofu 10, one and one-quarter cup rice vinegar 14, one-half cup crumbled blue cheese 20, one teaspoon fine herbs 22, one teaspoon onion powder 16, one teaspoon garlic powder 18. All of the ingredients are again placed in the blender 30 and blended on high speed until the ingredients are well mixed. All of the ingredients are placed in the blender 30 and blended on high until a fine mixture is obtained. The mixture is then placed in a glass container 32 under refrigeration until it is to be used.

The third example is a sweet dressing for fruit salads and has the following ingredients: one cup flax oil 12, one cup soft tofu 10, one cup rice vinegar 14, one teaspoon ginger from 24, one teaspoon ground cinnamon from 24, one teaspoon ground cloves from 24, and four tablespoons of honey from 24. All of the ingredients are placed in the blender 30 and blended on high until a fine mixture is obtained. The mixture is then placed in a glass container 32 under refrigeration until it is to be used.

The first three examples are salad dressings that are easy to pour and can be equated to an oil-and-vinegar-type dressing.

The fourth example is a thicker dressing suitable for such salads as macaroni or potato. The thick dressing includes the following ingredients: one cup flax oil 12, two cups soft tofu 10, one cup rice vinegar 14, one teaspoon fine herbs 22, one teaspoon garlic powder 18, and one teaspoon onion powder 16. The ingredients are placed in the blender 30 and blended on high until the dressing is well mixed. Note in this example that the amount of tofu is increased which provides a much thicker viscosity of the dressing. The mixture is then placed in a glass container 32 under refrigeration until it is to be used.

It will be appreciated that the ingredients of each of the recipes may be altered or changed to suit the tastes of the user. Also, the thickness of the dressing may be controlled by the amount of tofu that is provided in the dressing.

Those skilled in the art will recognize that modifications and variations may be made without departing from the true spirit and scope of the invention. The invention is therefore not to be limited to the embodiments described and illustrated but is to be determined from the appended claims.

What is claimed is:

1. A salad dressing consisting essentially of flax oil, soft tofu, vinegar and flavoring, said dressing being prepared by intermixing substantially equal amounts of flax oil, soft tofu and vinegar to prepare an oil-type dressing.

2. A salad dressing as defined in claim 1 wherein the ingredients consist essentially of:

one measure of flax oil;

one measure of soft tofu;

one measure of vinegar; and partial measures of flavoring herbs and spices to produce a desired taste.

3. A salad dressing as defined in claim 2, further including:

one measure of blue cheese.

4. A salad dressing as defined in claim 4, wherein:

the partial measures of flavoring are selected from the group of ginger, cinnamon, cloves and honey.

5. A salad dressing as defined in claim 1 wherein the ingredients consist essentially of:

one measure of flax oil;

one measure of soft tofu;

one measure of vinegar;

a partial measure of fine herbs;

a partial measure of garlic powder; and a partial measure of onion powder.

6. A salad dressing consisting essentially of flax oil, soft tofu, vinegar and flavoring, said dressing being prepared by intermixing substantially equal amounts of flax oil and vinegar with tofu in an amount exceeding either the flax oil or vinegar and up to or exceeding twice that of either the flax or vinegar to prepare a creamy salad dressing.

7. A salad dressing as defined in claim 2 wherein the flavoring is selected from the ingredients of:

garlic powder;

onion powder; and, fine herbs.

\* \* \* \* \*

UNITED STATES PATENT AND TRADEMARK OFFICE
CERTIFICATE OF CORRECTION

PATENT NO. : 6,090,432
DATED : 7/18/00
INVENTOR(S) : McKeown

It is certified that error appears in the above-identified patent and that said Letters Patent is hereby corrected as shown below:

Col. 4, line 57, "oil" should follow "flax".

Col. 4, line 59, "2" should be "6".

Signed and Sealed this

Twenty-sixth Day of September, 2000

*Attest:*

Q. TODD DICKINSON

*Attesting Officer*  *Director of Patents and Trademarks*